US012703367B2

(12) United States Patent
Kim et al.

(10) Patent No.: US 12,703,367 B2
(45) Date of Patent: Aug. 11, 2026

(54) APPARATUS FOR DETECTING ROAD SURFACE CONDITION

(71) Applicant: HL KLEMOVE CORP., Incheon (KR)

(72) Inventors: Chang-Won Kim, Incheon (KR); Dae-Youn Yun, Incheon (KR); Ye-Chan Jang, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 35 days.

(21) Appl. No.: 18/759,583

(22) Filed: Jun. 28, 2024

(65) Prior Publication Data

US 2025/0091585 A1 Mar. 20, 2025

(30) Foreign Application Priority Data

Sep. 19, 2023 (KR) ........................ 10-2023-0124572

(51) Int. Cl.
*B60W 40/06* (2012.01)
*B60C 23/04* (2006.01)

(52) U.S. Cl.
CPC ......... *B60W 40/06* (2013.01); *B60C 23/0486* (2013.01)

(58) Field of Classification Search
None
See application file for complete search history.

(56) References Cited

U.S. PATENT DOCUMENTS 11,565,705 B2 * 1/2023 Suzuki ................... G01H 17/00
2017/0349148 A1 12/2017 Bojanowski et al.

(Continued)

FOREIGN PATENT DOCUMENTS

DE 10 2018 203 071 9/2019
DE 10 2021 110 962 11/2021

(Continued)

OTHER PUBLICATIONS

Sayers et al., The Little Book of Profiling: Basic Information about Measuring and Interpreting Road Profiles, Sep. 1998, pp. 45-52. (Year: 1998).*

(Continued)

*Primary Examiner* — Todd Melton
(74) *Attorney, Agent, or Firm* — WOMBLE BOND DICKINSON (US) LLP

(57) ABSTRACT

An apparatus includes first and second measuring instruments placed on tires of right and left wheels of the vehicle; and a receiver placed in the vehicle. The first measuring instrument includes a first acceleration sensor for measuring vibration of the tire of the right wheel to generate first vibration data; a first measuring instrument controller for processing the first vibration data to generate first roughness information for the road surface; and a first measuring instrument communication module for transmitting the first roughness information to the receiver, and the second measuring instrument includes a second acceleration sensor for measuring vibration of the tire of the left wheel to generate second vibration data; a second measuring instrument controller for processing the second vibration data to generate second roughness information for the road surface; and a second measuring instrument communication module for transmitting the second roughness information to the receiver.

18 Claims, 8 Drawing Sheets

(56) References Cited

U.S. PATENT DOCUMENTS

| | | | | |
|---|---|---|---|---|
| 2022/0242337 | A1 | 8/2022 | Garg et al. | |
| 2022/0403609 | A1* | 12/2022 | Montorio | E01C 23/01 |

FOREIGN PATENT DOCUMENTS

| | | | |
|---|---|---|---|
| DE | 11 2017 005 021 | | 3/2023 |
| JP | 2010-66040 | | 3/2010 |
| JP | 2017-198507 | | 11/2017 |
| KR | 101888960 | B1 | 8/2018 |
| KR | 10-2020-0141557 | | 12/2020 |
| KR | 10-2021-0072283 | | 6/2021 |
| KR | 10-2023-0099861 | | 7/2023 |
| WO | 2021/247016 | | 12/2021 |

OTHER PUBLICATIONS

Office Action dated Nov. 29, 2024 for German Patent Application No. 10 2024 203 218.2 and its English translation by Google Translate.

Office Action dated Jun. 25, 2025 for Korean Patent Application No. 10-2023-0124572 and its English translation provided by Applicant's foreign counsel.

* cited by examiner

APPARATUS FOR DETECTING ROAD SURFACE CONDITION

CROSS-REFERENCE TO RELATED APPLICATION

This application claims priority to and the benefit of Korean Patent Application No. 10-2023-0124572, filed on Sep. 19, 2023, the disclosure of which is incorporated herein by reference in its entirety.

BACKGROUND

1. Technical Field

The present disclosure relates to an apparatus for detecting road surface condition, and more particularly, to an apparatus for detecting road surface installed in a vehicle to detect road surface conditions, such as the roughness of the road surface on which the vehicle runs.

[Project Identification Number] 2410004191
[Project Number] 20024837
[Ministry] Ministry of Trade, Industry and Energy
[Project Management (Specialized) Organization] Korea Planning & Evaluation Institute of Industrial Technology
[Name of Research Program] Development of automotive industry technology
[Research Project] Development of Technology of Automotive Smart Tire with Built-in 1 Hz-Class Complex Sensors for Future Vehicle Safety and Function Enhancement
[Name of Project Executing Organization] HL KLEMOVE CORPORATION
[Research Period] Jan. 1, 2024 to Dec. 31, 2024

2. Discussion of Related Art

The condition of the road pavement is an important factor related to safety when driving a vehicle. Road management entities, such as the government and local governments, continuously monitor road pavement conditions and perform maintenance.

Monitoring road pavement conditions can be done by measuring the degree of road surface irregularities in the longitudinal direction, the International Roughness Index (IRI), an index that evaluates plastic deformation, and detecting potholes and cracks that can cause damage to the vehicle due to dents and cracks on the road.

IRI measurement requires expensive measurement equipment and professional manpower, so the update cycle of measurement values for the same road section is set for a long time, and as a result, it has a problem that it is difficult to check the road condition in real time. In addition, the detection of potholes and cracks has limitations in that maintenance is mainly based on drivers' complaints and reports, and thus, the introduction of a systematic management system is required.

SUMMARY

The present disclosure is to solve the above problems, and an object of the present disclosure is to provide an apparatus for detecting road surface condition that can efficiently detect the condition of a road surface on which a vehicle is driving using sensors installed in the vehicle.

Another object of the present disclosure is to provide an apparatus for detecting road surface condition that can accurately and efficiently detect potholes formed on the road.

The objects of the present disclosure are not limited to the above-described objects, and other objects that are not mentioned will be able to be clearly understood by those skilled in the art to which the present disclosure pertains from the following description.

According to an aspect of the present disclosure, provided is an apparatus for detecting road surface condition, which is installed in a vehicle, of a road on which the vehicle is driving, that includes a first measuring instrument placed on a tire of a right wheel of the vehicle; a second measuring instrument placed on a tire of a left wheel of the vehicle; and a receiver placed in the vehicle, wherein the first measuring instrument includes a first acceleration sensor for measuring vibration of the tire of the right wheel to generate first vibration data; a first measuring instrument controller for processing the first vibration data to generate first roughness information for the road surface; and a first measuring instrument communication module for transmitting the first roughness information to the receiver, and wherein the second measuring instrument includes a second acceleration sensor for measuring vibration of the tire of the left wheel to generate second vibration data; a second measuring instrument controller for processing the second vibration data to generate second roughness information for the road surface; and a second measuring instrument communication module for transmitting the second roughness information to the receiver, and the receiver includes an in-vehicle communication module for receiving the first roughness information and the second roughness information; a receiver controller for processing the first roughness information and the second roughness information to generate final roughness information; and an external communication module for transmitting the final roughness information to the outside.

In the apparatus for detecting road surface condition according to an aspect of the present disclosure, the receiver may further include a position sensor for measuring a position of the vehicle to generate position information, and the external communication module may transmit the position information together with the final roughness information to the outside.

In the apparatus for detecting road surface condition according to an aspect of the present disclosure, the in-vehicle communication module may communicate with the first measuring instrument communication module and the second measuring instrument communication module in a short-range wireless communication method.

In the apparatus for detecting road surface condition according to an aspect of the present disclosure, the external communication module may perform communication in a wireless communication method.

In the apparatus for detecting road surface condition according to an aspect of the present disclosure, the first roughness information may include a first IRI (International Roughness Index) calculated from the first vibration data, and the second roughness information may include a second IRI calculated from the second vibration data.

In the apparatus for detecting road surface condition according to an aspect of the present disclosure, the receiver controller may calculate an average IRI from the first IRI and the second IRI, and normalize the average IRI by using at least one of a speed of the vehicle, an air pressure of the tire of the right wheel, and an air pressure of the tire of the left wheel as a factor, and the final roughness information may include the normalized IRI.

In the apparatus for detecting road surface condition according to an aspect of the present disclosure, the first measuring instrument may further include a first geomagnetic sensor for generating first geomagnetic data by measuring geomagnetism of the ground traveling by the tire of the right wheel, and the second measuring instrument may further include a second geomagnetic sensor for generating second geomagnetic data by measuring geomagnetism of the ground traveling by the tire of the left wheel.

In the apparatus for detecting road surface condition according to an aspect of the present disclosure, the first measuring instrument controller may determine that a first impact has occurred if the first vibration data is out of a reference vibration range, and determine whether the first geomagnetic data at the time when the first impact occurs is within a reference geomagnetic range, and the second measuring instrument controller may determine that a second impact has occurred if the second vibration data is out of a reference vibration range, and determine whether the second geomagnetic data at the time when the second impact occurs is within the reference geomagnetic range.

In the apparatus for detecting road surface condition according to an aspect of the present disclosure, if the first geomagnetic data at the time when the first impact occurs is within the reference geomagnetic range, the first measuring instrument controller may determine the impact as a pothole and generate first pothole information; the first measuring instrument communication module may transmit the first pothole information to the in-vehicle communication module; and the in-vehicle communication module may receive the first pothole information; and if the second geomagnetic data at the time when the second impact occurs is within the reference geomagnetic range, the second measuring instrument controller may determine the impact as a pothole and generate second pothole information; the second measuring instrument communication module may transmit the second pothole information to the in-vehicle communication module; and the in-vehicle communication module may receive the second pothole information.

In the apparatus for detecting road surface condition according to an aspect of the present disclosure, when the second pothole information is not received within a predetermined time range after receiving the first pothole information or when the first pothole information is not received within the predetermined time range after receiving the second pothole information, the receiver controller may determine that a pothole exists and generate pothole recognition information.

In the apparatus for detecting road surface condition according to an aspect of the present disclosure, when the pothole recognition information is generated, the receiver controller may generate pothole size information by calculating a size of the pothole using at least one of a speed of the vehicle, a pressure of the tire of the right wheel, and a pressure of the tire of the left wheel as a factor.

In the apparatus for detecting road surface condition according to an aspect of the present disclosure, if both the first pothole information and the second pothole information are received within a predetermined time range, the receiver controller may determine that a pothole does not exist on the road surface.

In the apparatus for detecting road surface condition according to an aspect of the present disclosure, if both the first pothole information and the second pothole information are received within a predetermined time range, the receiver controller may determine that at least one of a bump and a joint exists on the road surface.

According to another aspect of the present disclosure, provided is an apparatus for detecting road surface condition, which is installed in a vehicle, of a road on which the vehicle is driving, that includes a first measuring instrument placed on a tire of a right wheel of the vehicle; a second measuring instrument placed on a tire of a left wheel of the vehicle; and a receiver placed in the vehicle, wherein the first measuring instrument includes a first acceleration sensor for measuring vibration of the tire of the right wheel to generate first vibration data; and a first measuring instrument communication module for transmitting the first vibration data to the receiver, wherein the second measuring instrument includes a second acceleration sensor for measuring vibration of the tire of the left wheel to generate second vibration data; and a second measuring instrument communication module for transmitting the second vibration data to the receiver, and wherein the receiver includes an in-vehicle communication module for receiving the first vibration data and the second vibration data; a receiver controller for processing the first vibration data and the second vibration data to generate final roughness information; and an external communication module for transmitting the final roughness information to the outside.

In the apparatus for detecting road surface condition according to another aspect of the present disclosure, the receiver controller may calculate a primary IRI (International Roughness Index) from the first vibration data and the second vibration data.

In the apparatus for detecting road surface condition according to another aspect of the present disclosure, the receiver controller may normalize the primary IRI by using at least one of a speed of the vehicle, an air pressure of the tire of the right wheel, and an air pressure of the tire of the left wheel as a factor, and the final roughness information may include the normalized IRI.

In the apparatus for detecting road surface condition according to another aspect of the present disclosure, the first measuring instrument may further include a first geomagnetic sensor for generating first geomagnetic data by measuring geomagnetism of the ground traveling by the tire of the right wheel, and the first measuring instrument communication module may transmit the first geomagnetic data to the in-vehicle communication module, and the second measuring instrument may further include a second geomagnetic sensor for generating second geomagnetic data by measuring geomagnetism of the ground traveling by the tire of the left wheel, and the second measuring instrument communication module may transmit the second geomagnetic data to the in-vehicle communication module.

In the apparatus for detecting road surface condition according to another aspect of the present disclosure, the receiver controller may determine that a first impact has occurred if the first vibration data is out of a reference vibration range, and determine whether the first geomagnetic data at the time when the first impact occurs is within a reference geomagnetic range, and the receiver controller may determine that a second impact has occurred if the second vibration data is out of a reference vibration range, and determine whether the second geomagnetic data at the time when the second impact occurs is within the reference geomagnetic range.

In the apparatus for detecting road surface condition according to another aspect of the present disclosure, the receiver controller may generate pothole recognition information if the second impact does not occur within a predetermined time range from the time when the first impact occurs and the first geomagnetic data at the time when the first impact occurs is within the reference geomagnetic range or if the first impact does not occur within a predetermined time range from the time when the second impact occurs and the second geomagnetic data at the time when the second impact occurs is within the reference geomagnetic range.

In the apparatus for detecting road surface condition according to another aspect of the present disclosure, when the pothole recognition information is generated, the receiver controller may generate pothole size information by calculating a size of the pothole using at least one of a speed of the vehicle, a pressure of the tire of the right wheel, and a pressure of the tire of the left wheel as a factor.

In the apparatus for detecting road surface condition according to another aspect of the present disclosure, if the occurrence time of the first impact and the occurrence time of the second impact are within a predetermined time range, the receiver controller may determine that a pothole does not exist on the road surface.

In the apparatus for detecting road surface condition according to another aspect of the present disclosure, if the occurrence time of the first impact and the occurrence time of the second impact are within a predetermined time range, the receiver controller may determine that at least one of a speed bump and a joint exists on the road surface.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
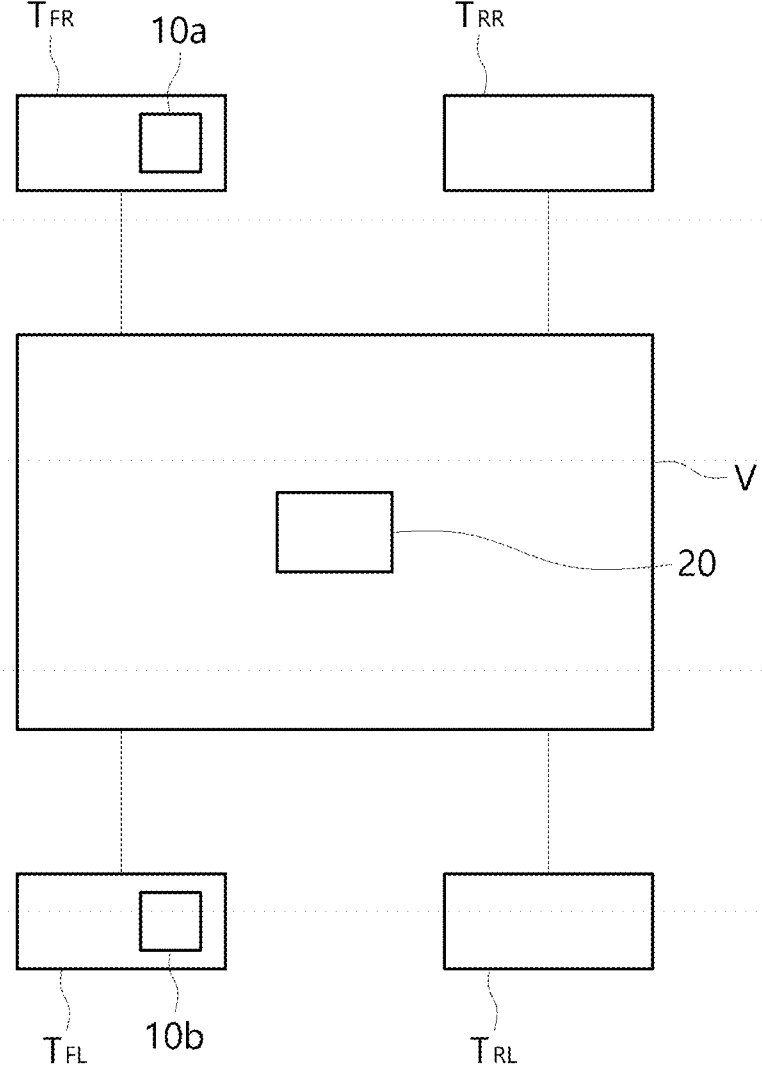
FIG. 1 is a diagram schematically showing a vehicle on which an apparatus for detecting road surface condition is installed according to an exemplary embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

FIG. 1 is a diagram schematically showing a vehicle on which an apparatus for detecting road surface condition is installed according to an exemplary embodiment of the present disclosure. In addition, FIG. 2 is a diagram showing a configuration of an apparatus for detecting road surface condition according to an exemplary embodiment of the present disclosure.

The apparatus 1 for detecting road surface condition according to an embodiment of the present disclosure is installed in a vehicle V and may detect the condition of a road surface on which the vehicle is driving. In more detail, the apparatus 1 for detecting road surface condition according to an embodiment of the present disclosure may measure the roughness of a road surface on which the vehicle is driving. In addition, the apparatus 1 for detecting road surface condition according to an embodiment of the present disclosure may recognize potholes existing on a road on which the vehicle is driving.

Information obtained or calculated by the apparatus 1 for detecting road surface condition according to an embodiment of the present disclosure may be transmitted to a management server 100 that exists externally. The management server 100 may calculate a road pavement condition, including the roughness of the road, the location and size of potholes, etc., based on information obtained from one or more apparatuses for detecting road surface condition.

Figure 2:
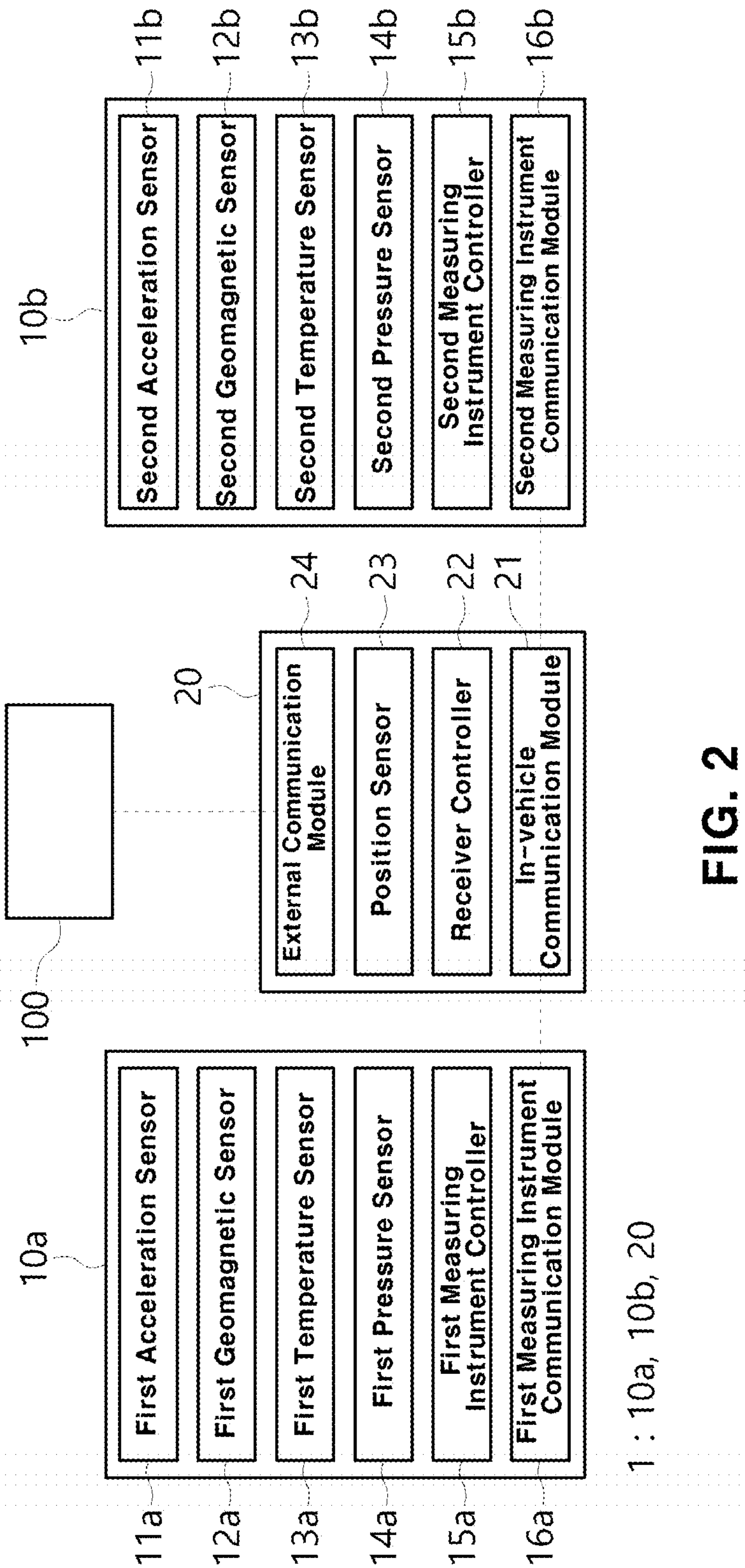
FIG. 2 is a diagram showing a configuration of an apparatus for detecting road surface condition according to an exemplary embodiment of the present disclosure.

Referring to FIGS. 1 and 2, the apparatus 1 for detecting road surface condition according to an embodiment of the present disclosure is an apparatus that is installed in a vehicle and detects the condition of a road surface on which the vehicle is driving, and may include a first measuring instrument 10*a*, a second measuring instrument 10*b*, and a receiver 20.

The first measuring instrument 10*a* may be placed on a tire of the right wheel of the vehicle. For example, the first measuring instrument 10*a* may be placed on a tire (TFR) of the front right wheel of the vehicle.

The first measuring instrument 10*a* may include a first acceleration sensor 11*a*, a first geomagnetic sensor 12*a*, a first temperature sensor 13*a*, a first pressure sensor 14*a*, a first measuring instrument controller 15*a*, and a first measuring instrument communication module 16*a*. In this case, the first measuring instrument 10*a* may be configured as a tire mounted sensor (TMS) installed on a tire of a vehicle.

The first acceleration sensor 11*a* generates first vibration data by measuring a vibration of a tire of a right wheel. In an embodiment of the present disclosure, the first acceleration sensor 11*a* may be installed on the tire TFR of the front right wheel of the vehicle to generate first vibration data by measuring vibration occurring on the front right wheel of the vehicle while the vehicle is driving.

The first vibration data is related to the roughness of a road surface on which the vehicle is driving. As the first vibration data increases, the roughness of the road surface may be considered to be lower.

The first geomagnetic sensor 12*a* generates first geomagnetic data by measuring geomagnetism of the ground traveling by the tire of the right wheel. In an embodiment of the present disclosure, the first geomagnetic sensor 12*a* may be installed on the tire TFR of the front right wheel of the vehicle to measure geomagnetism of a road surface in contact with the front right wheel of the vehicle while the vehicle is driving.

The first geomagnetic data enables the vehicle to detect a metal object placed on a road surface on which the vehicle is driving. If a metal object (e.g., a manhole cover) exists on the road surface, the first geomagnetic data appears relatively large.

The first temperature sensor 13*a* generates first temperature data by measuring an internal temperature of a tire of the right wheel. In an embodiment of the present disclosure, the first temperature sensor 13*a* may be installed on the tire TFR of the front right wheel of the vehicle to measure an internal temperature of the tire TFR of the front right wheel of the vehicle while the vehicle is driving.

The first pressure sensor 14*a* generates first pressure data by measuring an internal pressure of a tire of the right wheel. In an embodiment of the present disclosure, the first pressure sensor 14*a* may be installed on the tire TFR of the front right wheel of the vehicle to measure a pressure inside the tire TFR of the front right wheel of the vehicle while the vehicle is driving.

The first measuring instrument controller 15*a* may generate first roughness information on the road surface by processing the first vibration data. The first measuring instrument controller 15*a* may be configured as an MCU (Micro Controller Unit) that processes one or more algorithms that recognize the pavement condition of a road surface.

The first roughness information may include a first IRI (International Roughness Index) calculated from the first vibration data. IRI is a widely used index related to the comprehensive pavement condition of a road surface and indicates the roughness that causes vehicle vibration.

The first measuring instrument controller 15*a* may determine that a first impact has occurred if the first vibration data is out of a reference vibration range, and determine whether the first geomagnetic data at the time when the first impact occurs is within a reference geomagnetic range. In this case, the reference vibration range may be set to be within a range of vibration which may be obtained if the roughness of a road surface is greater than or equal to a predetermined reference.

If the first geomagnetic data at the time when the first impact occurs is within a reference geomagnetic range, the first measuring instrument controller 15*a* may determine the impact as a pothole and generate first pothole information. The reference geomagnetic range may be set to a range of geomagnetism that may be measured on a general road surface, not a metal material.

Meanwhile, if the first geomagnetic data at the time when the first impact occurs is out of the reference geomagnetic range, the first measuring instrument controller 15*a* may determine the impact was caused by a manhole, not a pothole. Since the manhole cover is made of a metal material such as iron, the first geomagnetic data at the time of passing through the manhole may appear to be out of the reference geomagnetic range.

Figure 3:
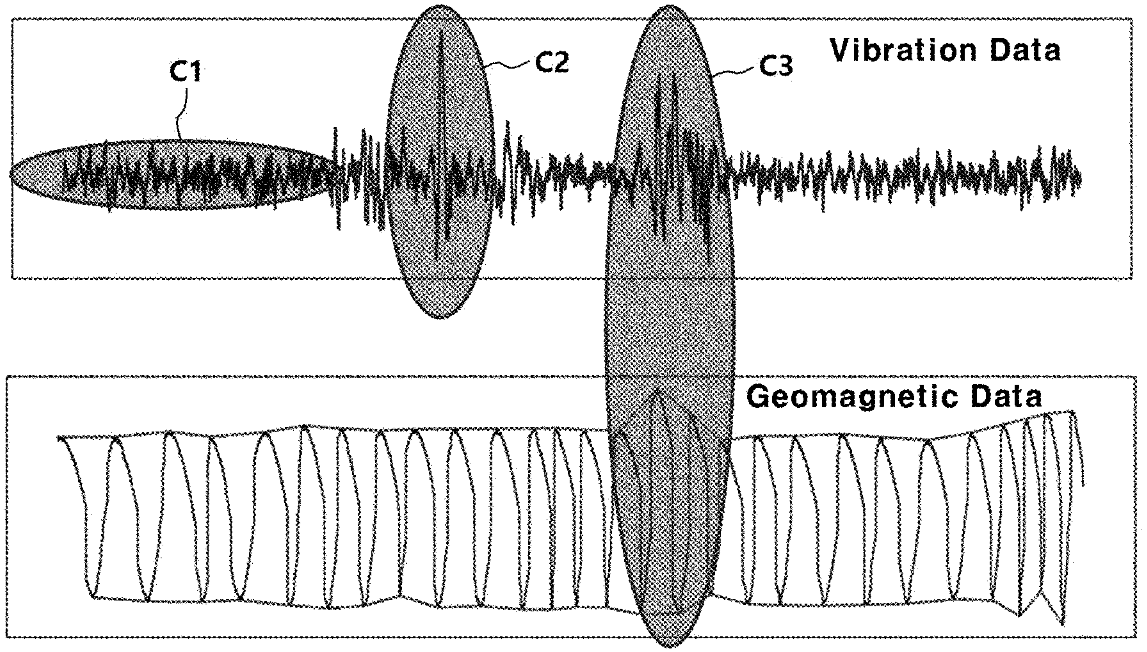
FIG. 3 is a diagram showing an example of vibration data and geomagnetic data measured by a first measuring instrument of an apparatus for detecting road surface condition according to an exemplary embodiment of the present disclosure.

FIG. 3 is a diagram showing an example of vibration data and geomagnetic data measured by a first measuring instrument of an apparatus for detecting road surface condition according to an exemplary embodiment of the present disclosure. In the vibration data and geomagnetic data shown in FIG. 3, all the horizontal axes represent time, the vertical axis of the vibration data represents amplitude, and the vertical axis of the geomagnetic data represents geomagnetic strength (in FIG. 3, units and numerical figures are omitted).

With reference to FIG. 3, a case where the first measuring instrument 10*a* generates the first roughness information or the first pothole information will be described in more detail.

First, if the first vibration data is within the reference vibration range (section C1 of FIG. 3), the first measuring instrument controller 15*a* may process the first vibration data to generate first roughness information on the road surface. As described above, the first roughness information may include a first IRI calculated from the first vibration data.

Next, if the first vibration data is out of the reference vibration range and the first geomagnetic data is within the reference geomagnetic range (section C2 of FIG. 3), the first measuring instrument controller 15*a* may determine the impact as a pothole and generate first pothole information.

Finally, if the first vibration data is out of the reference vibration range and the first geomagnetic data is out of the reference geomagnetic range (section C3 of FIG. 3), the first measuring instrument controller 15*a* may determine the impact was caused by a manhole, not a pothole. In this case, the first measuring instrument controller 15*a* does not generate the first pothole information.

The first measuring instrument communication module 16*a* may transmit the first roughness information to the receiver 20. In addition, when the first pothole information is generated, the first measuring instrument communication module 16*a* may transmit the first pothole information to the receiver 20. In addition, the first measuring instrument communication module 16*a* may transmit the first temperature data and the first pressure data to the receiver 20.

The first measuring instrument communication module 16*a* may communicate with the receiver 20 in a short-range wireless communication method. For example, the first measuring instrument communication module 16*a* may communicate with the receiver 20 in a Bluetooth low energy (BLE) method.

The second measuring instrument 10*b* may be placed on a tire of the left wheel of the vehicle. For example, the second measuring instrument 10*b* may be placed on a tire (TFL) of the front left wheel of the vehicle.

The second measuring instrument 10*b* may include a second acceleration sensor 11*b*, a second geomagnetic sensor 12*b*, a second temperature sensor 13*b*, a second pressure sensor 14*b*, a second measuring instrument controller 15*b*, and a second measuring instrument communication module 16*b*. In this case, the second measuring instrument 10*b* may be configured as a tire mounted sensor (TMS) installed on a tire of a vehicle.

The second acceleration sensor 11*b* generates second vibration data by measuring a vibration of a tire of a left wheel. In an embodiment of the present disclosure, the second acceleration sensor 11*b* may be installed on the tire TFL of the front left wheel of the vehicle to generate second vibration data by measuring vibration occurring on the front left wheel of the vehicle while the vehicle is driving.

The second vibration data is related to the roughness of a road surface on which the vehicle is driving. As the second vibration data increases, the roughness of the road surface may be considered to be lower.

The second geomagnetic sensor 12*b* generates second geomagnetic data by measuring geomagnetism of the ground traveling by the tire of the left wheel. In an embodiment of the present disclosure, the second geomagnetic sensor 12*b* may be installed on the tire TFL of the front left wheel of the vehicle to measure geomagnetism of a road surface in contact with the front left wheel of the vehicle while the vehicle is driving.

The second geomagnetic data enables the vehicle to detect a metal object placed on a road surface on which the vehicle is driving. If a metal object (e.g., a manhole cover) exists on the road surface, the second geomagnetic data appears relatively large.

The second temperature sensor 13*b* generates second temperature data by measuring an internal temperature of a tire of the left wheel. In an embodiment of the present disclosure, the second temperature sensor 13*b* may be installed on the tire TFL of the front left wheel of the vehicle to measure an internal temperature of the tire TFL of the front left wheel of the vehicle while the vehicle is driving.

The second pressure sensor 14*b* generates second pressure data by measuring an internal pressure of a tire of the left wheel. In an embodiment of the present disclosure, the second pressure sensor 14*b* may be installed on the tire TFL of the front left wheel of the vehicle to measure a pressure inside the tire TFL of the front left wheel of the vehicle while the vehicle is driving.

The second measuring instrument controller 15*b* may generate second roughness information on the road surface by processing the second vibration data. The second measuring instrument controller 15*b* may be configured as an MCU (Micro Controller Unit) that processes one or more algorithms that recognize the pavement condition of a road surface.

The second roughness information may include a second IRI (International Roughness Index) calculated from the second vibration data. As described above, IRI is a widely used index related to the comprehensive pavement condition of a road surface and indicates the roughness that causes vehicle vibration.

The second measuring instrument controller 15*b* may determine that a second impact has occurred if the second vibration data is out of a reference vibration range, and determine whether the second geomagnetic data at the time when the second impact occurs is within a reference geomagnetic range. In this case, the reference vibration range may be set to be within a range of vibration which may be obtained if the roughness of a road surface is greater than or equal to a predetermined reference.

If the second geomagnetic data at the time when the second impact occurs is within a reference geomagnetic range, the second measuring instrument controller 15*b* may determine the impact as a pothole and generate second pothole information. The reference geomagnetic range may be set to a range of geomagnetism that may be measured on a general road surface, not a metal material.

Meanwhile, if the second geomagnetic data at the time when the second impact occurs is out of the reference geomagnetic range, the second measuring instrument controller 15*b* may determine the impact was caused by a manhole, not a pothole. It is because since the manhole cover is made of a metal material such as iron, the second geomagnetic data at the time of passing through the manhole may appear to be out of the reference geomagnetic range.

The contents described with reference to FIG. 3 regarding the information generation of the first measuring instrument 10*a* can also be applied to the second measuring instrument 10*b* as the same.

That is, if the second vibration data is within the reference vibration range, the second measuring instrument controller 15*b* may process the second vibration data to generate second roughness information on the road surface.

In addition, if the second vibration data is out of the reference vibration range and the second geomagnetic data is within the reference geomagnetic range, the second measuring instrument controller 15*b* may determine the impact as a pothole and generate second pothole information.

In addition, if the second vibration data is out of the reference vibration range and the second geomagnetic data is out of the reference geomagnetic range, the second measuring instrument controller 15*b* determines the impact was caused by a manhole, not a pothole and does not generate the second pothole information.

The second measuring instrument communication module 16*b* may communicate with the receiver 20 in a short-range wireless communication method. For example, the short-range wireless communication method may be a Bluetooth Low Energy (BLE) method.

The receiver 20 is placed in the vehicle. For example, the receiver 20 may be placed on the body of the vehicle rather than on the tires. The receiver 20 may be configured as an independent Electronic Control Unit (ECU). Meanwhile, the receiver 20 may be placed within a vehicle's infotainment system.

Referring to FIG. 2, the receiver 20 may include an in-vehicle communication module 21, a receiver controller 22, a position sensor 23, and an external communication module 24.

The in-vehicle communication module 21 receives the first roughness information and the second roughness information. The in-vehicle communication module 21 may communicate with the first measuring instrument communication module 16*a* and the second measuring instrument communication module 16*b*, receive the first roughness information from the first measuring instrument communication module 16*a*, and receive the second roughness information from the second measuring instrument communication module 16*b*.

The in-vehicle communication module 21 may receive the first pothole information from the first measuring instrument communication module 16*a*. In addition, the in-vehicle communication module 21 may also receive the first temperature data and the first pressure data from the first measuring instrument communication module 16*a*.

The in-vehicle communication module 21 may receive the second pothole information from the second measuring instrument communication module 16*b*. In addition, the in-vehicle communication module 21 may also receive the second temperature data and the second pressure data from the second measuring instrument communication module 16*b*.

The in-vehicle communication module 21 may communicate with the first measuring instrument communication module 16*a* and the second measuring instrument communication module 16*b* in a short-range wireless communication method. For example, the short-range wireless communication method may be a BLE method.

The receiver controller 22 may generate final roughness information by processing the first roughness information and the second roughness information. For example, receiver controller 22 may be configured as an MCU (Micro Controller Unit) that processes one or more algorithms.

Figure 4:
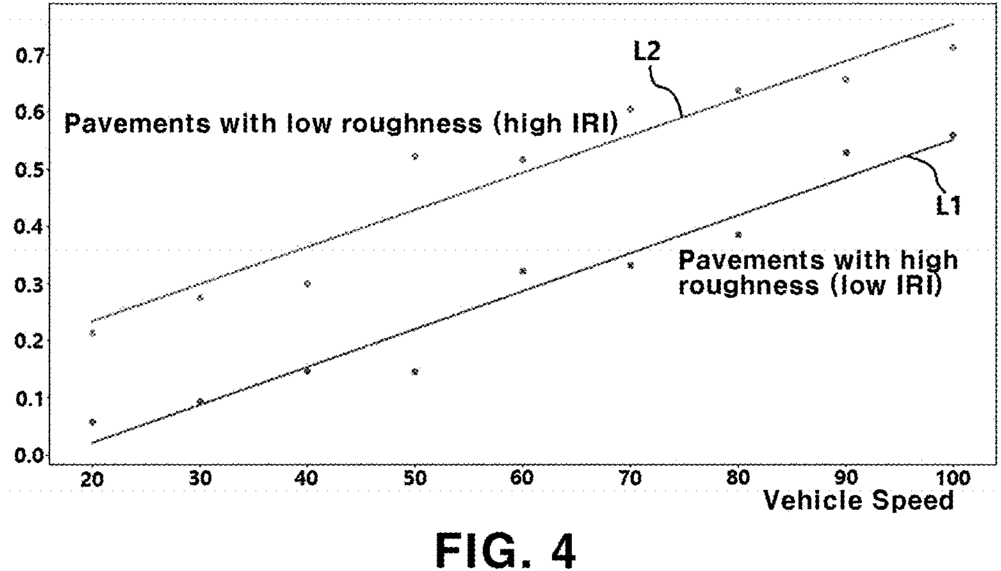
FIG. 4 is a diagram showing the IRI (International Roughness Index) of a road surface according to vehicle speed without normalization.

FIG. 4 is a diagram showing the IRI (International Roughness Index) of a road surface according to vehicle speed without normalization.

In FIG. 4, the horizontal axis represents the speed of the vehicle and the vertical axis represents the IRI. The unit of speed of the vehicle may be km/h.

In FIG. 4, a first straight line L1 showing the IRI on a first road surface with relatively high roughness and a second straight line L2 showing the IRI on a second road surface with relatively low roughness are illustrated. Referring to these, it can be seen that even on the same road surface, the IRI is also largely calculated as the speed of the vehicle increases.

However, the IRI for the same road surface needs to be determined regardless of the vehicle speed. That is, the receiver controller 22 needs to calculate normalized IRI by eliminating factors such as vehicle speed. In other words, the final roughness information needs to include normalized IRI.

The receiver controller 22 may calculate an average IRI from the first IRI and the second IRI, and normalize the average IRI by using at least one of the speed of the vehicle, the air pressure of the tire of the right wheel, and the air pressure of the tire of the left wheel as a factor.

In this case, the speed of the vehicle may be obtained from the position sensor 23 described later. In addition, the speed of the vehicle may be obtained from the CAN of the vehicle. Meanwhile, the air pressure of the tire of the right wheel may be the first pressure data, and the air pressure of the tire of the left wheel may be the second pressure data. In addition, the receiver controller 22 may reflect the first temperature data and the second temperature data as factors when normalizing the average IRI.

The position sensor 23 generates position information by measuring the position of the vehicle. The position information generated by the position sensor 23 can inform the location of the road whose roughness is being measured. In addition, the speed of the vehicle may be calculated based on the position information measured by the position sensor 23. For example, the position sensor 23 may be GPS.

The external communication module 24 transmits the final roughness information to the outside. The external communication module 24 may transmit the position information together with the final roughness information to the outside. The external communication module 24 may transmit the final roughness information and the position information to the external management server 100.

The external communication module 24 may communicate in a wireless communication method. For example, the external communication module 24 may communicate with the external management server 100 through LTE, 5G, or the like.

Meanwhile, in an embodiment of the present disclosure, the receiver controller 22 may use the first pothole information or the second pothole information in addition to the final roughness information to determine whether the pothole actually exists on the road on which the vehicle is driving, and generate pothole recognition information if it is determined that the pothole exists.

Figure 5:
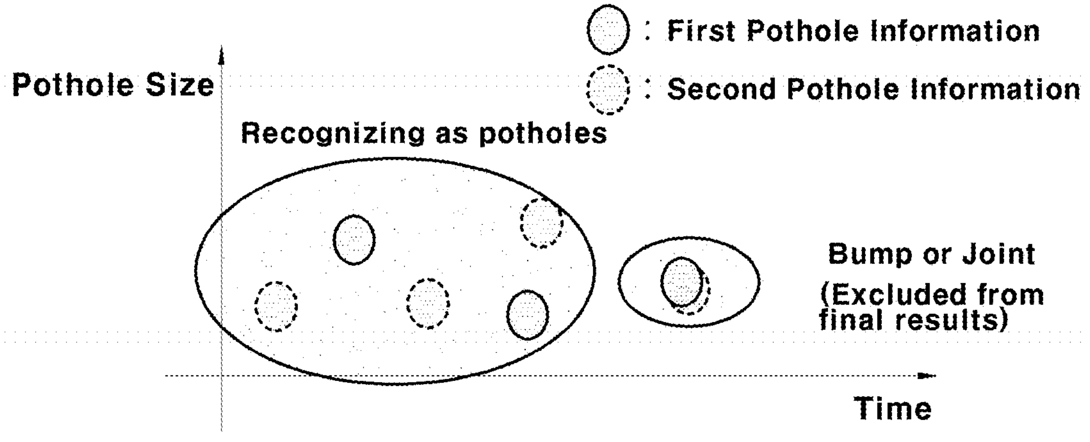
FIG. 5 is a diagram showing pothole recognition criterion of an apparatus for detecting road surface condition according to an exemplary embodiment of the present disclosure.

FIG. 5 is a diagram showing pothole recognition criterion of an apparatus for detecting road surface condition according to an exemplary embodiment of the present disclosure. In FIG. 5, the horizontal axis represents time and the vertical axis represents the size of the pothole.

Hereinafter, a method of generating the pothole recognition information by the receiver controller 22 will be described with reference to FIG. 5.

When the second pothole information is not received within a predetermined time range after receiving the first pothole information or when the first pothole information is not received within the predetermined time range after receiving the second pothole information, the receiver controller 22 may determine that a pothole exists and generate pothole recognition information. In this case, the predetermined time range may be set as a time range in which the first impact and the second impact may be considered to occur simultaneously.

When the second pothole information is not received within a predetermined time range after the first pothole information is received, or when the first pothole information is not received within the predetermined time range after the second pothole information is received, it means a situation in which only the first impact or the second impact occurs within the predetermined time range. It may be considered that either the right wheel or the left wheel of the vehicle has passed through a pothole formed on the road surface. Accordingly, the receiver controller 22 may determine that a pothole exists on the road surface and generate pothole recognition information.

Meanwhile, if both the first pothole information and the second pothole information are received within a predetermined time range, the receiver controller 22 may determine that a pothole does not exist on the road surface. If the first pothole information and the second pothole information are received within the predetermined time range, the first impact and the second impact may be regarded as occurring simultaneously. This means that the right and left wheels of the vehicle are simultaneously impacted.

In this way, a situation in which an impact is applied to the right and left wheels of the vehicle at the same time may occur when the vehicle passes through a speed bump or joint on the road. Therefore, if both the first pothole information and the second pothole information are received within a predetermined time range, the receiver controller 22 may determine that at least one of a bump and a joint exists on the road surface.

In an embodiment of the present disclosure, when the pothole recognition information is generated, the receiver controller 22 may generate pothole size information by calculating the size of the pothole using at least one of the speed of the vehicle, the pressure of the tire of the right wheel, and the pressure of the tire of the left wheel as a factor.

In this case, the speed of the vehicle may be obtained using the position information generated by the position sensor 23 as described above. In addition, the speed of the vehicle may be obtained from the CAN of the vehicle. Meanwhile, the air pressure of the tire of the right wheel may be the first pressure data, and the air pressure of the tire of the left wheel may be the second pressure data. In addition, the receiver controller 22 may reflect the first temperature data and the second temperature data as factors when generating the pothole size information.

When the receiver controller 22 generates the pothole recognition information and the pothole size information, the external communication module 24 may transmit the pothole recognition information and the pothole size information to the outside. In this case, the external communication module 24 may transmit position information recognized as having the pothole existing together with the pothole recognition information and the pothole size information to the outside. In this case, the position information may be obtained by the position sensor 23.

As described above, the configuration of the apparatus for detecting road surface condition according to an embodiment of the present disclosure has been described in detail. Hereinafter, a detailed operation process of each of the first measuring instrument 10*a*, the second measuring instrument 10*b*, and the receiver 20 of the apparatus for detecting road surface condition according to an embodiment of the present disclosure will be described.

Figure 6:
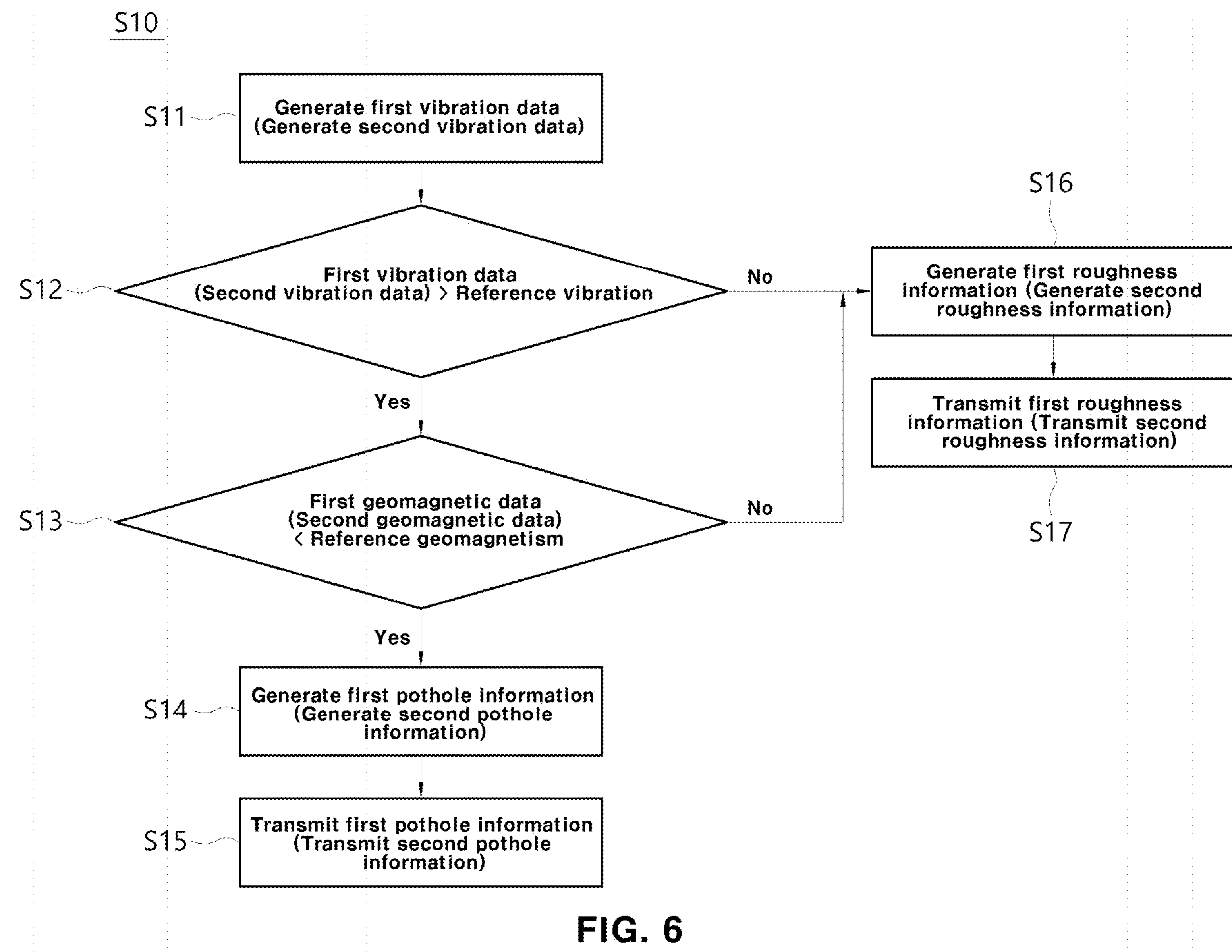
FIG. 6 is a diagram showing an operation process of a first measuring instrument or second measuring instrument of an apparatus for detecting road surface condition according to an exemplary embodiment of the present disclosure.

FIG. 6 is a diagram showing an operation process of a first measuring instrument or second measuring instrument of an apparatus for detecting road surface condition according to an exemplary embodiment of the present disclosure. Referring to FIG. 6, the operation process S10 of the first measuring instrument 10*a* or the second measuring instrument 10*b* may be performed as follows.

First, the first acceleration sensor 11*a* of the first measuring instrument 10*a* generates first vibration data. Alternatively, the second acceleration sensor 11*b* of the second measuring instrument 10*b* generates second vibration data (S11). The first vibration data and the second vibration data are indicators indicating the roughness of the road surface on which the vehicle is driving.

Next, the first measuring instrument controller 15*a* of the first measuring instrument 10*a* determines whether the first vibration data exceeds the reference vibration. Alternatively, the second measuring instrument controller 15*b* of the second measuring instrument 10*b* determines whether the second vibration data exceeds the reference vibration (S12). In this case, the reference vibration may be set to a predetermined vibration magnitude.

Next, if the first vibration data exceeds the reference vibration, the first measuring instrument controller 15*a* determines whether the first geomagnetic data generated by the first geomagnetic sensor 12*a* is less than the reference geomagnetism. Alternatively, if the second vibration data exceeds the reference vibration, the second measuring instrument controller 15*b* determines whether the second geomagnetic data generated by the second geomagnetic sensor 12*b* is less than the reference geomagnetism (S13). Here, the reference geomagnetism may be set to a predetermined geomagnetic intensity.

Next, if the first vibration data exceeds the reference vibration and the first geomagnetic data is less than the reference geomagnetism, the first measuring instrument controller 15*a* generates first pothole information. Alternatively, if the second vibration data exceeds the reference vibration and the second geomagnetic data is less than the reference geomagnetism, the second measuring instrument controller 15*b* generates second pothole information (S14).

Next, the first measuring instrument communication module 16*a* transmits the first pothole information to the in-vehicle communication module 21 of the receiver 20. Alternatively, the second measuring instrument communication module 16*b* transmits the second pothole information to the in-vehicle communication module 21 of the receiver 20 (S15).

Meanwhile, if the first vibration data is less than or equal to the reference vibration or the first vibration data exceeds the reference vibration and the first geomagnetic data exceeds the reference geomagnetism, the first measuring instrument controller 15*a* generates first roughness information. Alternatively, if the second vibration data is less than or equal to the reference vibration or the second vibration data exceeds the reference vibration and the second geomagnetic data exceeds the reference geomagnetism, the second measuring instrument controller 15*b* generates second roughness information (S16).

As described above, the first roughness information may include a first IRI. In addition, the second roughness information may include a second IRI.

Finally, the first measuring instrument communication module 16*a* transmits the first roughness information to the in-vehicle communication module 21 of the receiver 20. Alternatively, the second measuring instrument communication module 16*b* transmits the second roughness information to the in-vehicle communication module 21 of the receiver 20 (S17).

Figure 7:
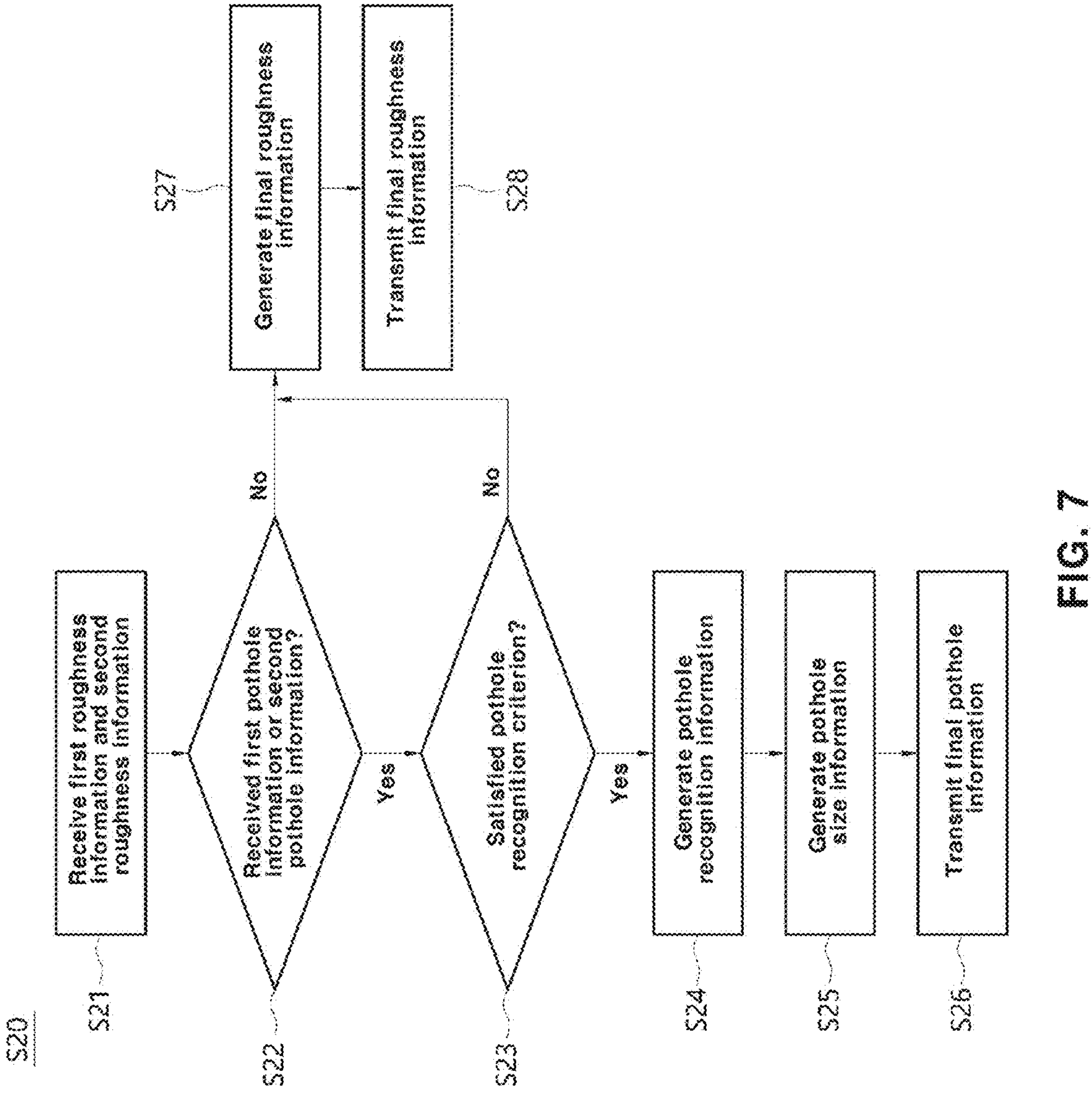
FIG. 7 is a diagram showing an operation process of a receiver of an apparatus for detecting road surface condition according to an exemplary embodiment of the present disclosure.

FIG. 7 is a diagram showing an operation process of a receiver of an apparatus for detecting road surface condition according to an exemplary embodiment of the present disclosure. Referring to FIG. 7, the operation process S20 of the receiver 20 may be performed as follows.

First, the in-vehicle communication module 21 of the receiver 20 receives the first roughness information and the second roughness information (S21).

Next, the receiver controller 22 determines whether the first pothole information or the second pothole information is received (S22). The first pothole information and the second pothole information may be received by the in-vehicle communication module 21 of the receiver 20.

Next, if the first pothole information or the second pothole information is received, the receiver controller 22 determines whether a pothole recognition criterion is satisfied (S23). The pothole recognition criterion may be set to a case in which the second pothole information is not received within a predetermined time range after receiving the first pothole information or a case in which the first pothole information is not received within the predetermined time range after receiving the second pothole information. In this case, the predetermined time range may be set as a time range in which the first impact and the second impact may be considered to occur simultaneously.

If the pothole recognition criterion is satisfied, it means a situation in which only the first impact or the second impact occurs within a predetermined time range. It may be considered that either the right wheel or the left wheel of the vehicle has passed through a pothole formed on the road surface.

Next, if the pothole recognition criterion is satisfied, the receiver controller 22 generates pothole recognition information (S24). If the pothole recognition criterion is satisfied, the receiver controller 22 may determine that the pothole exists on the road surface of the road on which the vehicle is driving and generate pothole recognition information.

Next, the receiver controller 22 generates pothole size information (S25). For example, the receiver controller 22 may generate the pothole size information by calculating the size of the pothole using at least one of the speed of the vehicle, the pressure of the tire of the right wheel, and the pressure of the tire of the left wheel as a factor.

In this case, the speed of the vehicle may be obtained using the position information generated by the position sensor 23. Meanwhile, the air pressure of the tire of the right wheel may be the first pressure data, and the air pressure of the tire of the left wheel may be the second pressure data. In addition, the receiver controller 22 may reflect the first temperature data and the second temperature data as factors when generating the pothole size information.

Next, the external communication module 24 of the receiver 20 transmits final pothole information to the outside (S26). Here, the final pothole information may include position information recognized as having the pothole existing together with the pothole recognition information and the pothole size information. The position information may be obtained by the position sensor 23.

Meanwhile, if the first pothole information and the second pothole information are not received or the first pothole information or the second pothole information is received but does not meet the pothole recognition criterion, the receiver controller 22 generates final roughness information (S27). The receiver controller 22 may generate final roughness information by processing the first roughness information and the second roughness information.

In this case, the receiver controller 22 may calculate normalized IRI by eliminating factors such as vehicle speed. In other words, the final roughness information needs to include normalized IRI. In more detail, the receiver controller 22 may calculate an average IRI from the first IRI and the second IRI, and normalize the average IRI by using at least one of the speed of the vehicle, the air pressure of the tire of the right wheel, and the air pressure of the tire of the left wheel as a factor.

In this case, the speed of the vehicle may be obtained from the position sensor 23. In addition, the speed of the vehicle may be obtained from the CAN of the vehicle. Meanwhile, the air pressure of the tire of the right wheel may be the first pressure data, and the air pressure of the tire of the left wheel may be the second pressure data. In addition, the receiver controller 22 may reflect the first temperature data and the second temperature data as factors when normalizing the average IRI.

Finally, the external communication module 24 of the receiver 20 transmits the final roughness information to the outside (S28). In this case, the external communication module 24 may transmit the position information together with the final roughness information to the outside. In more detail, the external communication module 24 may transmit the final roughness information and the position information to the external management server 100.

In the above, the configuration and operation of the apparatus 1 for detecting road surface condition according to an embodiment of the present disclosure have been described in detail. Hereinafter, an apparatus for detecting road surface condition according to another embodiment of the present disclosure will be described.

Figure 8:
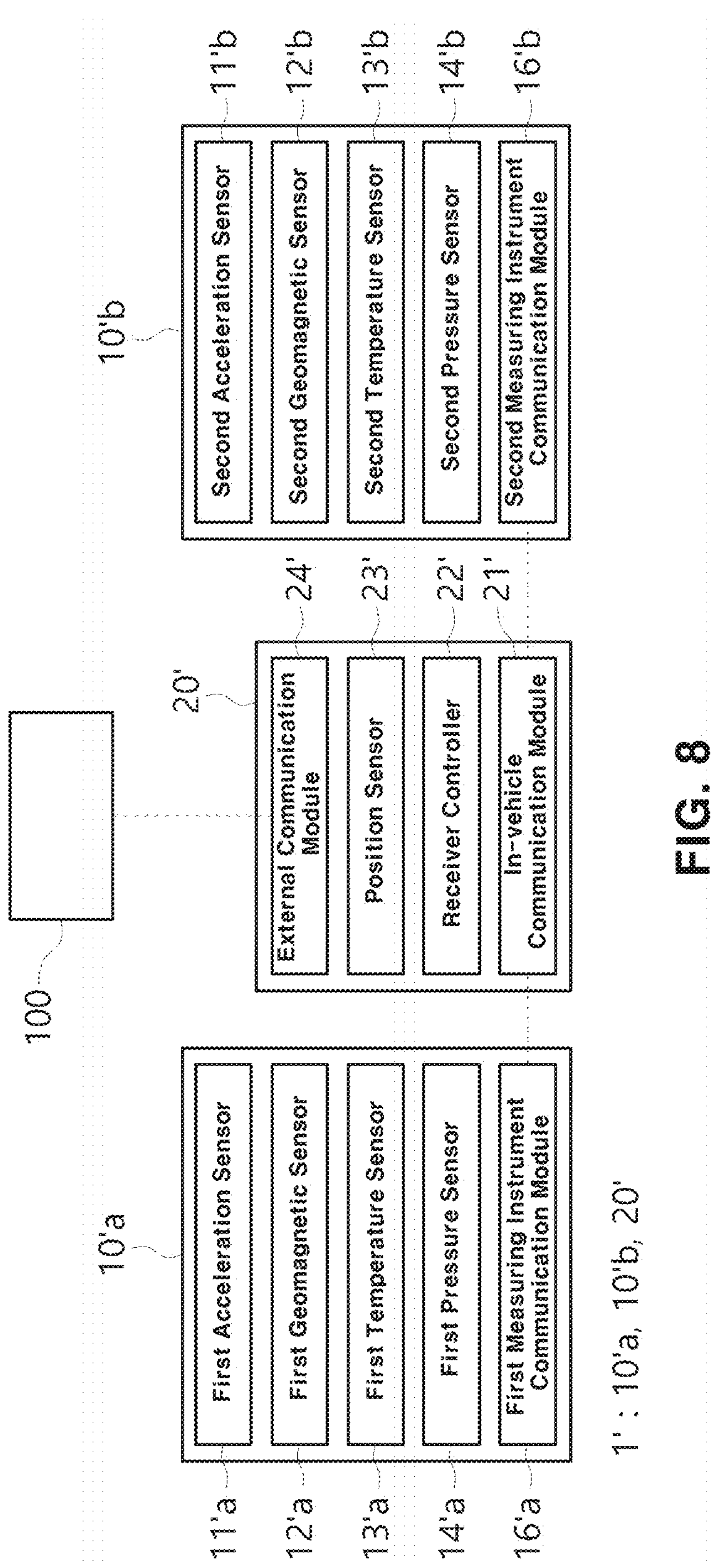
FIG. 8 is a diagram showing a configuration of an apparatus for detecting road surface condition according to another exemplary embodiment of the present disclosure.

FIG. 8 is a diagram showing a configuration of an apparatus for detecting road surface condition according to another exemplary embodiment of the present disclosure.

Referring to FIG. 8, the apparatus 1' for detecting road surface condition according to another embodiment of the present disclosure is an apparatus that is installed in a vehicle and detects the condition of a road surface on which the vehicle is driving, and may include a first measuring instrument 10'*a*, a second measuring instrument 10'*b*, and a receiver 20'.

In another embodiment of the present disclosure, the first measuring instrument 10'*a* may be placed on a tire of the right wheel of the vehicle. For example, the first measuring instrument 10'*a* may be placed on a tire of the front right wheel of the vehicle.

The first measuring instrument 10'*a* may include a first acceleration sensor 11'*a*, a first geomagnetic sensor 12'*a*, a first temperature sensor 13'*a*, a first pressure sensor 14'*a*, and a first measuring instrument communication module 16'*a*. In this case, the first measuring instrument 10*a* may be configured as a tire mounted sensor (TMS) installed on a tire of a vehicle.

The first acceleration sensor 11'*a* generates first vibration data by measuring a vibration of a tire of a right wheel of a vehicle. In another embodiment of the present disclosure, the first acceleration sensor 11'*a* may be placed on the tire of the front right wheel of the vehicle to generate first vibration data by measuring vibration occurring while driving.

The first geomagnetic sensor 12'*a* generates first geomagnetic data by measuring geomagnetism of the ground traveling by the tire of the right wheel. In another embodiment of the present disclosure, the first geomagnetic sensor 12'*a* may be placed on the tire of the front right wheel of the vehicle to measure geomagnetism of a road surface in contact with the front right wheel of the vehicle while the vehicle is driving.

The first temperature sensor 13'*a* generates first temperature data by measuring an internal temperature of a tire of the right wheel. In another embodiment of the present disclosure, the first temperature sensor 13'*a* may be placed on the tire of the front right wheel of the vehicle to measure an internal temperature of the tire.

In addition, the first pressure sensor 14'*a* generates first pressure data by measuring an internal pressure of a tire of the right wheel. In another embodiment of the present disclosure, the first pressure sensor 14'*a* may be placed on the tire of the front right wheel of the vehicle to measure an internal temperature of the tire.

In another embodiment of the present disclosure, the first measuring instrument communication module 16'*a* transmits the first vibration data to the receiver 20'. In addition, the first measuring instrument communication module 16'*a* may transmit the first geomagnetic data, the first temperature data, and the first pressure data to the receiver 20'.

In another embodiment of the present disclosure, the second measuring instrument 10'*b* may be placed on a tire of the left wheel of the vehicle. For example, the second measuring instrument 10'*b* may be placed on a tire of the front left wheel of the vehicle.

The second measuring instrument 10'*b* may include a second acceleration sensor 11'*b*, a second geomagnetic sensor 12'*b*, a second temperature sensor 13'*b*, a second pressure sensor 14'*b*, and a second measuring instrument communication module 16'*b*. In this case, the second measuring instrument 10'*b* may be configured as a tire mounted sensor (TMS) installed on a tire of a vehicle.

The second acceleration sensor 11'*b* generates second vibration data by measuring a vibration of a tire of a left wheel of a vehicle. In another embodiment of the present disclosure, the second acceleration sensor 11'*b* may be placed on the tire of the front left wheel of the vehicle to generate second vibration data by measuring vibration occurring while the vehicle is driving.

The second geomagnetic sensor 12'*b* generates second geomagnetic data by measuring geomagnetism of the ground traveling by the tire of the left wheel. In another embodiment of the present disclosure, the second geomagnetic sensor 12'*b* may be placed on the tire of the front left wheel of the vehicle to measure geomagnetism of a road surface in contact with the front left wheel of the vehicle while the vehicle is driving.

The second temperature sensor 13'*b* generates second temperature data by measuring an internal temperature of a tire of the left wheel. In another embodiment of the present disclosure, the second temperature sensor 13'*b* may be placed on the tire of the front left wheel of the vehicle to measure an internal temperature of the tire.

In addition, the second pressure sensor 14'*b* generates second pressure data by measuring an internal pressure of a tire of the left wheel. In another embodiment of the present disclosure, the second pressure sensor 14'*b* may be placed on the tire of the front left wheel of the vehicle to measure an internal temperature of the tire.

In another embodiment of the present disclosure, the second measuring instrument communication module 16'*b* the second vibration data to the receiver 20'. In addition, the second measuring instrument communication module 16'*b* transmit the second geomagnetic data, the second temperature data, and the second pressure data to the receiver 20'.

The receiver 20' is placed in the vehicle. In another embodiment of the present disclosure, the receiver 20' may be placed on the body of the vehicle rather than on the tires. The receiver 20' may be configured as an independent Electronic Control Unit (ECU). Meanwhile, the receiver 20' may be placed within a vehicle's infotainment system.

Referring to FIG. 8, the receiver 20' may include an in-vehicle communication module 21', a receiver controller 22', a position sensor 23', and an external communication module 24'.

The in-vehicle communication module 21' receives the first vibration data and the second vibration data. The in-vehicle communication module 21' may also receive the first temperature data and the first pressure data from the first measuring instrument communication module 16'*a*. In addition, the in-vehicle communication module 21' may also receive the second temperature data and the second pressure data from the second measuring instrument communication module 16'*b*.

The in-vehicle communication module 21' may communicate with the first measuring instrument communication module 16'*a* and the second measuring instrument communication module 16'*b* in a short-range wireless communication method. For example, the short-range wireless communication method may be a Bluetooth Low Energy (BLE) method.

The receiver controller 22' generate final roughness information by processing the first vibration data and the second vibration data. For example, receiver controller 22' may be configured as an MCU (Micro Controller Unit) that processes one or more algorithms.

In another embodiment of the present disclosure, the receiver controller 22' may calculate a primary IRI (International Roughness Index) from the first vibration data and the second vibration data. For example, the primary IRI may be obtained by averaging the first IRI obtained from the first vibration data and the second IRI obtained from the second vibration data.

In addition, the receiver controller 22' may normalize the primary IRI using at least one of the speed of the vehicle, the pressure of the tire of the right wheel, and the pressure of the tire of the left wheel as a factor. In other words, the final roughness information may include the normalized IRI.

In this case, the speed of the vehicle may be obtained from the position sensor 23' of the receiver 20'. In addition, the speed of the vehicle may be obtained from the CAN of the vehicle. Meanwhile, the air pressure of the tire of the right wheel may be the first pressure data, and the air pressure of the tire of the left wheel may be the second pressure data. In addition, the receiver controller 22' may reflect the first temperature data and the second temperature data as factors when normalizing the average IRI.

The position sensor 23' generates position information by measuring the position of the vehicle. The position information generated by the position sensor 23' can inform the location of the road whose roughness is being measured. In addition, the speed of the vehicle may be calculated based on the position information measured by the position sensor 23'. For example, the position sensor 23' may be GPS.

The external communication module 24' transmits the final roughness information to the outside. The external communication module 24' may transmit the position information together with the final roughness information to the outside. The external communication module 24' may transmit the final roughness information and the position information to the external management server 100.

The external communication module 24' may communicate in a wireless communication method. For example, the external communication module 24' may communicate with the external server 100 through LTE, 5G, or the like.

Meanwhile, in another embodiment of the present disclosure, the receiver controller 22' may also generate pothole recognition information as follows.

The receiver controller 22' may determine that a first impact has occurred if the first vibration data is out of a reference vibration range, and determine whether the first geomagnetic data at the time when the first impact occurs is within a reference geomagnetic range. In addition, receiver controller 22' may also determine that a second impact has occurred if the second vibration data is out of a reference vibration range, and determine whether the second geomagnetic data at the time when the second impact occurs is within the reference geomagnetic range.

The receiver controller 22' may generate pothole recognition information if the second impact does not occur within a predetermined time range from the time when the first impact occurs and the first geomagnetic data at the time when the first impact occurs is within the reference geomagnetic range or if the first impact does not occur within a predetermined time range from the time when the second impact occurs and the second geomagnetic data at the time when the second impact occurs is within the reference geomagnetic range. In this case, the predetermined time range may be set as a time range in which the first impact and the second impact may be considered to occur simultaneously.

In addition, when the pothole recognition information is generated, the receiver controller 22' may generate pothole size information by calculating the size of the pothole using at least one of the speed of the vehicle, the pressure of the tire of the right wheel, and the pressure of the tire of the left wheel as a factor.

In this case, the speed of the vehicle may be obtained using the position information generated by the position sensor 23'. In addition, the speed of the vehicle may be obtained from the CAN of the vehicle. Meanwhile, the air pressure of the tire of the right wheel may be the first pressure data, and the air pressure of the tire of the left wheel may be the second pressure data. In addition, the receiver controller 22 may reflect the first temperature data and the second temperature data as factors when generating the pothole size information.

Meanwhile, in another embodiment of the present disclosure, if the occurrence time of the first impact and the occurrence time of the second impact are within a predetermined time range, the receiver controller 22' may determine that a pothole does not exist on the road surface. For example, the receiver controller 22' may determine that at least one of a speed bump and a joint exists on the road surface if the occurrence time of the first impact and the occurrence time of the second impact are within a predetermined time range.

If the first pothole information and the second pothole information are received within the predetermined time range, the first impact and the second impact may be regarded as occurring simultaneously. This means that the right and left wheels of the vehicle are simultaneously impacted. In this way, a situation in which an impact is applied to the right and left wheels of the vehicle at the same time may occur when the vehicle passes through a speed bump or joint on the road. Therefore, if the occurrence time of the first impact and the occurrence time of the second impact are within a predetermined time range, the receiver controller 22' may determine that at least one of a bump and a joint exists on the road surface.

When the receiver controller 22' generates the pothole recognition information and the pothole size information, the external communication module 24' may transmit the pothole recognition information and the pothole size information to the outside. In this case, the external communication module 24' may transmit position information recognized as having the pothole existing together with the pothole recognition information and the pothole size information to the outside. In this case, the position information may be obtained by the position sensor 23'.

The apparatus 1' for detecting road surface condition according to another embodiment of the present disclosure differs from the apparatus 1 for detecting road surface condition according to an embodiment of the present disclosure in that the first measuring instrument 10'*a* and the second measuring instrument 10'*b* do not have a measuring instrument controller that generates roughness information or pothole information. According to another embodiment of the present disclosure, the first measuring instrument 10'*a* and the second measuring instrument 10'*b* do not generate roughness information or pothole information, and the receiver controller 22' of the receiver 20' generates final roughness information or pothole recognition information, so that the detection of the road surface condition may be performed more efficiently.

The apparatus 1 for detecting road surface condition according to an embodiment of the present disclosure differs from the apparatus 1' for detecting road surface condition according to another embodiment of the present disclosure in that the first measuring instrument 10*a* and the second measuring instrument 10*b* generate roughness information or pothole information. According to an embodiment of the present disclosure, in-vehicle transmission/reception data may be reduced, and high efficiency may be secured in terms of power management of the first measuring instrument 10*a* and the second measuring instrument 10*b*.

According to the present disclosure, it is possible to measure the road pavement condition based on a measuring instrument composed of TMS already installed in the vehicle without using equipment such as a special road profiler that has been used in the past. Accordingly, it is possible to minimize the cost and time in monitoring the pavement condition of the road.

In addition, according to the present disclosure, the time difference between the timing of measuring the pavement condition and the establishment of a maintenance plan may be reduced through real-time pavement condition monitoring of the entire road. Accordingly, the effect of road maintenance performed on a limited budget can be maximized.

In addition, the present disclosure enables rapid maintenance through real-time detection of potholes rapidly increasing after a rainy season or heavy snow, and prevents accidents caused by road surfaces.

Furthermore, the present disclosure enables predictive maintenance that detects and responds to road obstacles such as potholes at the beginning, or before they occur through real-time monitoring of road pavement conditions.

In addition, the present disclosure can determine the optimal route for an autonomous vehicle to its destination through real-time pavement condition sharing among autonomous vehicles, optimize driving according to the road pavement condition, prevent accidents, and improve ride comfort.

According to the above configuration, the apparatus for detecting road surface condition according to an aspect of the present disclosure may efficiently calculate the roughness of a road surface on which a vehicle is driving based on vibration data obtained from a measuring instrument placed on a tire of the vehicle.

In addition, the apparatus for detecting road surface condition according to an aspect of the present disclosure can effectively recognize a pothole present on a road surface on which a vehicle is driving through vibration data and geomagnetic data obtained from a measuring instrument placed on a tire of the vehicle.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. An apparatus for detecting road surface condition, which is installed in a vehicle, of a road on which the vehicle is driving, comprising:

a first measuring instrument placed on a tire of a right wheel of the vehicle;

a second measuring instrument placed on a tire of a left wheel of the vehicle; and a receiver placed in the vehicle, wherein the first measuring instrument comprises:

a first acceleration sensor for measuring vibration of the tire of the right wheel to generate first vibration data;

a first measuring instrument controller for processing the first vibration data to generate first roughness information for the road surface; and a first measuring instrument communicator configured to transmit the first roughness information to the receiver, wherein the second measuring instrument comprises:

a second acceleration sensor for measuring vibration of the tire of the left wheel to generate second vibration data;

a second measuring instrument controller for processing the second vibration data to generate second roughness information for the road surface; and a second measuring instrument communicator configured to transmit the second roughness information to the receiver, and wherein the receiver comprises:

an in-vehicle communicator configured to receive the first roughness information and the second roughness information;

a receiver controller configured to process the first roughness information and the second roughness information to generate final roughness information; and an external communicator configured to transmit the final roughness information to the outside, wherein the first measuring instrument further comprises a first geomagnetic sensor for generating first geomagnetic data by measuring geomagnetism of the ground traveling by the tire of the right wheel, and wherein the second measuring instrument further comprises a second geomagnetic sensor for generating second geomagnetic data by measuring geomagnetism of the ground traveling by the tire of the left wheel.

2. The apparatus for detecting road surface condition of claim 1, wherein the receiver further comprises a position sensor for measuring a position of the vehicle to generate position information, and the external communicator transmits the position information together with the final roughness information to the outside.

3. The apparatus for detecting road surface condition of claim 1, wherein the in-vehicle communicator communicates with the first measuring instrument communicator and the second measuring instrument communicator in a short-range wireless communication method.

4. The apparatus for detecting road surface condition of claim 1, wherein the external communicator performs communication in a wireless communication method.

5. The apparatus for detecting road surface condition of claim 1, wherein the first roughness information comprises a first IRI (International Roughness Index) calculated from the first vibration data, and the second roughness information comprises a second IRI calculated from the second vibration data.

6. The apparatus for detecting road surface condition of claim 5, wherein the receiver controller calculates an average IRI from the first IRI and the second IRI, and normalizes the average IRI by using at least one of a speed of the vehicle, an air pressure of the tire of the right wheel, and an air pressure of the tire of the left wheel as a factor, and the final roughness information comprises the normalized IRI.

7. The apparatus for detecting road surface condition of claim 1, wherein the first measuring instrument controller determines that a first impact has occurred if the first vibration data is out of a reference vibration range, and determines whether the first geomagnetic data at the time when the first impact occurs is within a reference geomagnetic range, and wherein the second measuring instrument controller determines that a second impact has occurred if the second vibration data is out of a reference vibration range, and determines whether the second geomagnetic data at the time when the second impact occurs is within the reference geomagnetic range.

8. The apparatus for detecting road surface condition of claim 7, wherein if the first geomagnetic data at the time when the first impact occurs is within the reference geomagnetic range, the first measuring instrument controller determines the impact as a pothole and generates first pothole information; the first measuring instrument communicator transmits the first pothole information to the in-vehicle communicator; and the in-vehicle communicator receives the first pothole information, and wherein if the second geomagnetic data at the time when the second impact occurs is within the reference geomagnetic range, the second measuring instrument controller determines the impact as a pothole and generates second pothole information; the second measuring instrument communicator transmits the second pothole information to the in-vehicle communicator; and the in-vehicle communicator receives the second pothole information.

9. The apparatus for detecting road surface condition of claim 8, wherein when the second pothole information is not received within a predetermined time range after receiving the first pothole information or when the first pothole information is not received within the predetermined time range after receiving the second pothole information, the receiver controller determines that a pothole exists and generates pothole recognition information.

10. The apparatus for detecting road surface condition of claim 9, wherein when the pothole recognition information is generated, the receiver controller generates pothole size information by calculating a size of the pothole using at least one of a speed of the vehicle, a pressure of the tire of the right wheel, and a pressure of the tire of the left wheel as a factor.

11. The apparatus for detecting road surface condition of claim 8, wherein if both the first pothole information and the second pothole information are received within a predetermined time range, the receiver controller determines that a pothole does not exist on the road surface.

12. The apparatus for detecting road surface condition of claim 8, wherein if both the first pothole information and the second pothole information are received within a predetermined time range, the receiver controller determines that at least one of a bump and a joint exists on the road surface.

13. An apparatus for detecting road surface condition, which is installed in a vehicle, of a road on which the vehicle is driving, comprising:

a first measuring instrument placed on a tire of a right wheel of the vehicle;

a second measuring instrument placed on a tire of a left wheel of the vehicle; and a receiver placed in the vehicle, wherein the first measuring instrument comprises:

a first acceleration sensor for measuring vibration of the tire of the right wheel to generate first vibration data; and a first measuring instrument communicator configured to transmit the first vibration data to the receiver, wherein the second measuring instrument comprises:

a second acceleration sensor for measuring vibration of the tire of the left wheel to generate second vibration data; and a second measuring instrument communicator for transmitting the second vibration data to the receiver, and wherein the receiver comprises:

an in-vehicle communicator configured to receive the first vibration data and the second vibration data;

a receiver controller configured to process the first vibration data and the second vibration data to generate final roughness information; and an external communicator configured to transmit the final roughness information to the outside, wherein the first measuring instrument further comprises a first geomagnetic sensor for generating first geomagnetic data by measuring geomagnetism of the ground traveling by the tire of the right wheel, and the first measuring instrument communicator transmits the first geomagnetic data to the in-vehicle communicator, and wherein the second measuring instrument further comprises a second geomagnetic sensor for generating second geomagnetic data by measuring geomagnetism of the ground traveling by the tire of the left wheel, and the second measuring instrument communicator transmits the second geomagnetic data to the in-vehicle communicator.

14. The apparatus for detecting road surface condition of claim 13, wherein the receiver controller determines that a first impact has occurred if the first vibration data is out of a reference vibration range, and determines whether the first geomagnetic data at the time when the first impact occurs is within a reference geomagnetic range, and wherein the receiver controller determines that a second impact has occurred if the second vibration data is out of a reference vibration range, and determines whether the second geomagnetic data at the time when the second impact occurs is within the reference geomagnetic range.

15. The apparatus for detecting road surface condition of claim 14, wherein the receiver controller generates pothole recognition information if the second impact does not occur within a predetermined time range from the time when the first impact occurs and the first geomagnetic data at the time when the first impact occurs is within the reference geomagnetic range or if the first impact does not occur within a predetermined time range from the time when the second impact occurs and the second geomagnetic data at the time when the second impact occurs is within the reference geomagnetic range.

16. The apparatus for detecting road surface condition of claim 15, wherein when the pothole recognition information is generated, the receiver controller generates pothole size information by calculating a size of the pothole using at least one of a speed of the vehicle, a pressure of the tire of the right wheel, and a pressure of the tire of the left wheel as a factor.

17. The apparatus for detecting road surface condition of claim 14, wherein if the occurrence time of the first impact and the occurrence time of the second impact are within a predetermined time range, the receiver controller determines that a pothole does not exist on the road surface.

18. The apparatus for detecting road surface condition of claim 14, wherein if the occurrence time of the first impact and the occurrence time of the second impact are within a predetermined time range, the receiver controller determines that at least one of a speed bump and a joint exists on the road surface.

* * * * *